US012142847B2

(12) United States Patent
Kajikiya et al.

(10) Patent No.: US 12,142,847 B2
(45) Date of Patent: Nov. 12, 2024

(54) ANTENNA DEVICE AND ANTENNA MODULE HAVING THE SAME

(71) Applicant: TDK CORPORATION, Tokyo (JP)

(72) Inventors: Shoma Kajikiya, Tokyo (JP); Masaki Matsushima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 228 days.

(21) Appl. No.: 17/676,405

(22) Filed: Feb. 21, 2022

(65) Prior Publication Data

US 2022/0285841 A1 Sep. 8, 2022

(30) Foreign Application Priority Data

Mar. 2, 2021 (JP) ................................ 2021-032359

(51) Int. Cl.
*H01Q 5/10* (2015.01)
*H01Q 7/00* (2006.01)

(52) U.S. Cl.
CPC ................ *H01Q 7/00* (2013.01); *H01Q 5/10* (2015.01)

(58) Field of Classification Search
CPC ............ H01Q 7/00; H01Q 5/10; H01Q 21/29; H01Q 1/38; H01Q 1/241; H01Q 7/06; H01Q 23/00
See application file for complete search history.

(56) References Cited

U.S. PATENT DOCUMENTS

| | | | | |
|---|---|---|---|---|
| 2007/0194993 A1* | 8/2007 | Deavours | H01Q 23/00 343/700 MS |
| 2015/0145746 A1* | 5/2015 | Lu | H01Q 1/38 343/867 |
| 2015/0333389 A1 | 11/2015 | Orihara et al. | |
| 2017/0005391 A1* | 1/2017 | Tenno | H04B 5/0037 |
| 2019/0173175 A1* | 6/2019 | Mikawa | H01Q 1/36 |
| 2020/0373650 A1* | 11/2020 | Nasu | H01Q 21/30 |
| 2020/0380332 A1 | 12/2020 | Matsushima et al. | |
| 2020/0381802 A1 | 12/2020 | Matsushima et al. | |

FOREIGN PATENT DOCUMENTS

| | | |
|---|---|---|
| JP | 2008199306 A | 8/2008 |
| JP | 2009021970 A | 1/2009 |
| JP | 2009065426 A | 3/2009 |
| JP | 2020195049 A | 12/2020 |
| WO | 2017086083 A1 | 5/2017 |

* cited by examiner

*Primary Examiner* — Hai V Tran
*Assistant Examiner* — Michael M Bouizza
(74) *Attorney, Agent, or Firm* — YOUNG LAW FIRM, P.C.

(57) ABSTRACT

Disclosed herein is an antenna device that includes a substrate; and a first coil pattern, a second coil pattern, and a first capacitor which are provided on a surface of the substrate. An opening region of the first coil pattern is smaller in area than an opening region of the second coil pattern. The first coil pattern is disposed so as to overlap the opening region of the second coil pattern. One of the first and second coil patterns is connected to the first capacitor to constitute a closed circuit.

20 Claims, 9 Drawing Sheets

ANTENNA DEVICE AND ANTENNA MODULE HAVING THE SAME

CROSS-REFERENCE TO RELATED APPLICATION

This application claims the benefit of Japanese Patent Application No. 2021-032359, filed on Mar. 2, 2021, the entire disclosure of which is incorporated by reference herein.

BACKGROUND

Field

The present disclosure relates to an antenna device and an antenna module having the same.

Description of Related Art

There is known, as one of short distance wireless communication standards, NFC (Near Field Communication) which is a system for performing wireless communication through an antenna coil. To extend communication distance in wireless communication, Japanese Patent No. 4,358,242 proposes a configuration in which a booster antenna is disposed between an RFIC tag and an RFIC reader/writer.

However, the booster antenna disclosed in Japanese Patent No. 4,358,242 is disposed so as to be spaced by about 6 mm from the RFIC reader/writer, and therefore has a disadvantage that it requires a large space therefor. The booster antenna disclosed in Japanese Patent No. 4,358,242 has another disadvantage that its constituent components inevitably increase because a coil pattern constituting the booster antenna needs to be connected with a capacitor.

SUMMARY

It is therefore an object of the present disclosure to provide an antenna module with reduced space requirements and a reduced number of components.

An antenna device according to one embodiment of the present disclosure includes a substrate; and a first coil pattern, a second coil pattern, and a first capacitor. The first coil pattern, second coil pattern, and first capacitor are provided on a surface of the substrate. An opening region of the first coil pattern is smaller in area than an opening region of the second coil pattern. The first coil pattern is disposed so as to overlap the opening region of the second coil pattern. One of the first and second coil patterns is connected to the first capacitor to constitute a closed circuit.

According to the present disclosure, there can be provided an antenna device with reduced space requirements and a reduced number of components and an antenna module having such an antenna device.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
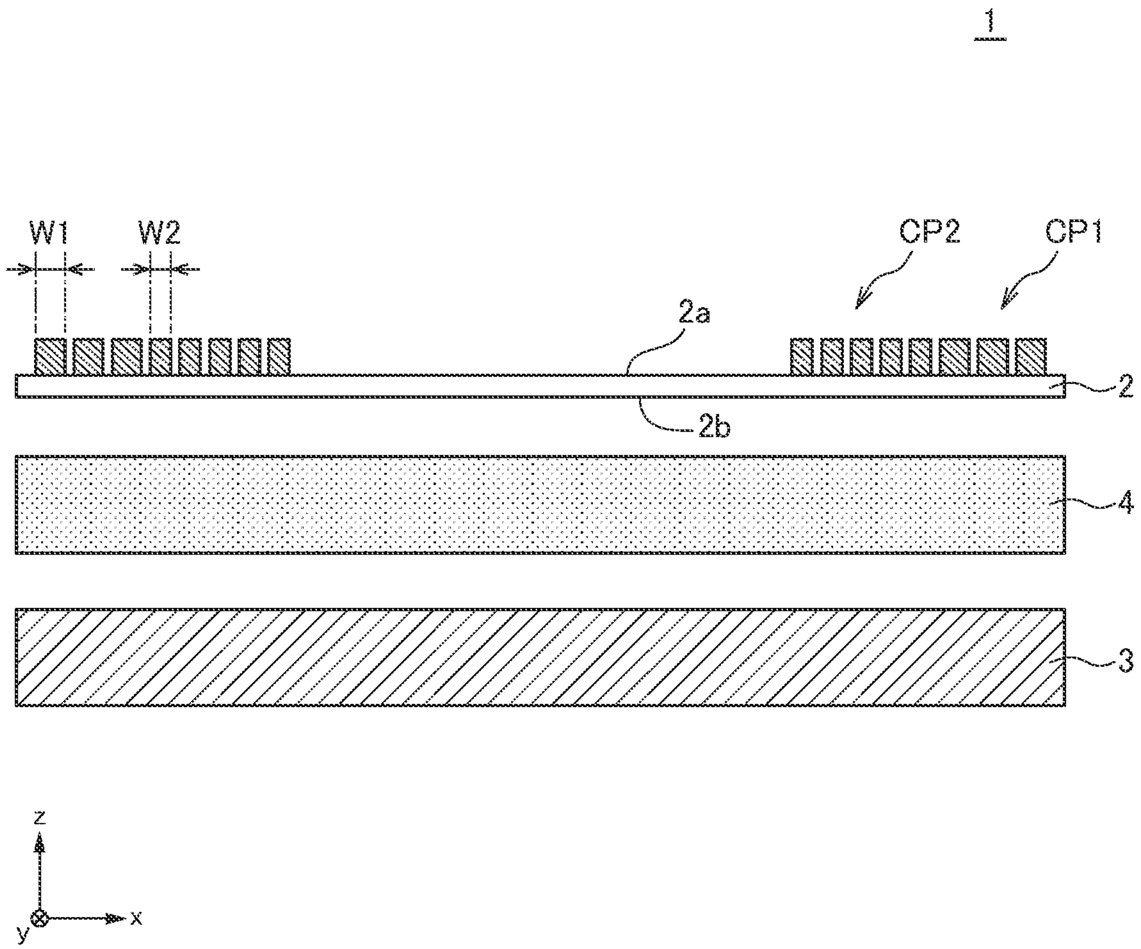
FIG. 1 is a schematic cross-sectional view for explaining the structure of an antenna device 1 according to one embodiment.

FIG. 1 is a schematic cross-sectional view for explaining the structure of an antenna device 1 according to one embodiment.

As illustrated in FIG. 1, an antenna device 1 according to one embodiment includes a substrate 2 made of a PET film or the like, coil patterns CP1 and CP2 provided on a surface 2*a* of the substrate 2, a metal member 3 disposed overlapping the substrate 2, and a magnetic member 4 disposed between the substrate 2 and the metal member 3. The coil pattern CP1 is an antenna coil connected to an IC module. The coil pattern CP2 is a booster antenna coupled to the antenna coil to extend communication distance.

Figure 2:
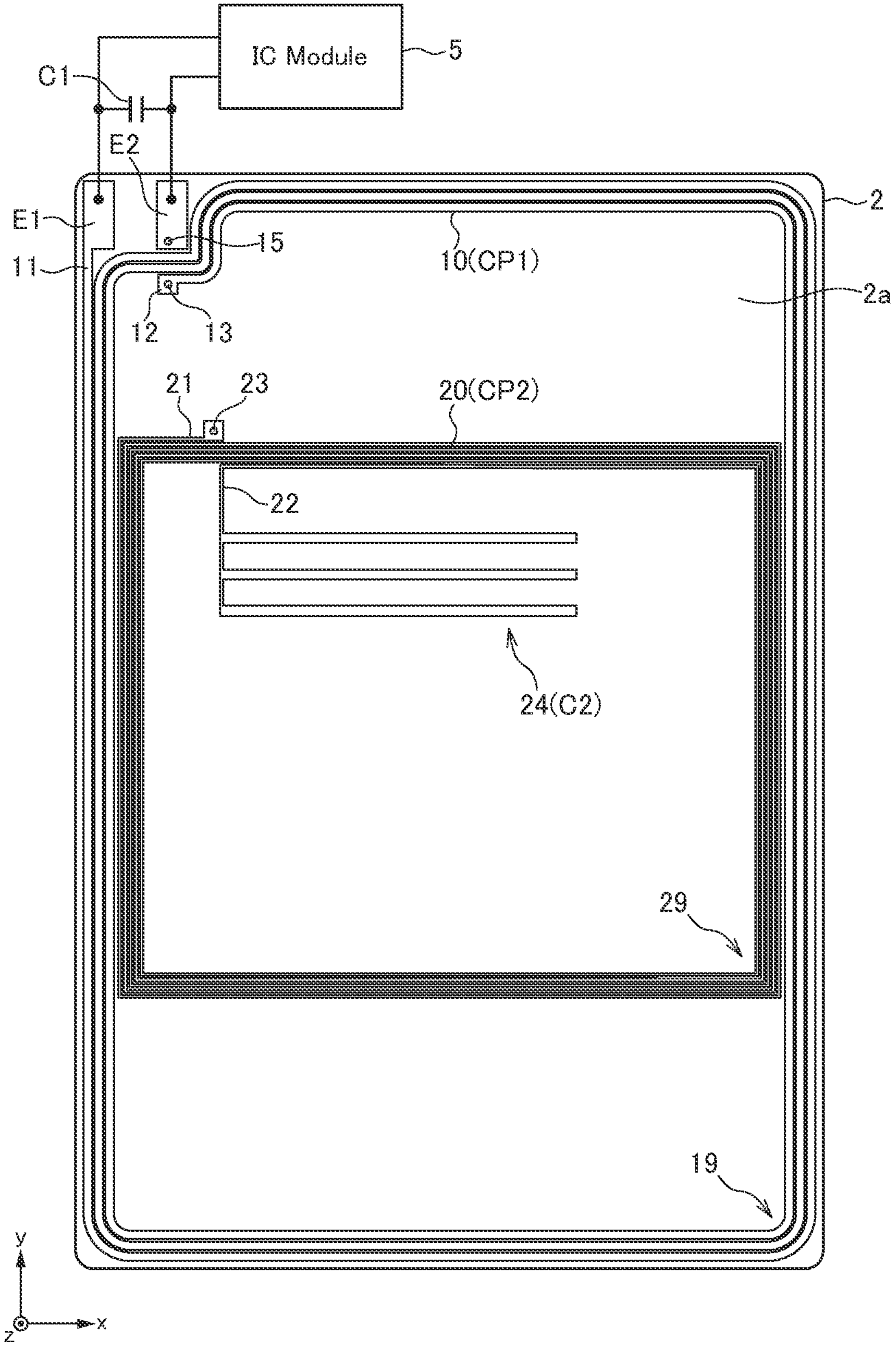
FIG. 2 is a schematic plan view illustrating the shape of a conductor pattern formed on the surface 2*a* of the substrate 2.
Figure 3:
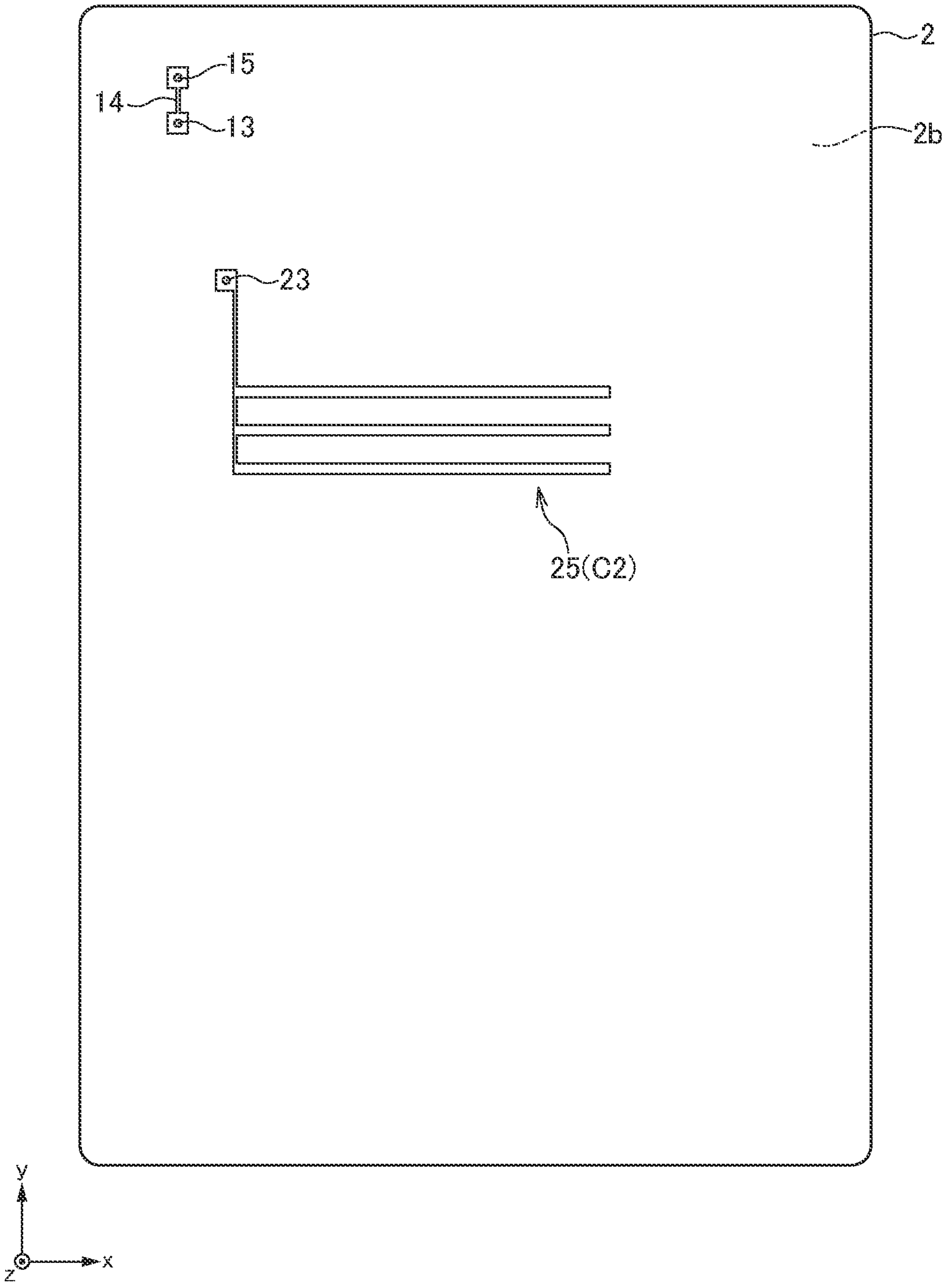
FIG. 3 is a schematic plan view illustrating the shape of a conductor pattern formed on a surface 2*b* of the substrate 2.

FIG. 2 is a schematic plan view illustrating the shape of a conductor pattern formed on the surface 2*a* of the substrate 2. FIG. 3 is a schematic plan view illustrating the shape of a conductor pattern formed on a surface 2*b* of the substrate 2 as viewed through the substrate 2 from the surface 2*a* side.

As illustrated in FIG. 2, there are formed on the surface 2*a* of the substrate 2 a conductor pattern 10 spirally wound in three turns and a conductor pattern 20 spirally wound in five turns. The conductor pattern 10 constitutes the coil pattern CP1, and the conductor pattern constitutes the coil pattern CP2. That is, in the example illustrated in FIGS. 2 and 3, the coil pattern CP2 has a larger number of turns than the coil pattern CP1. The conductor patterns 10 and 20 each have a substantially rectangular shape as viewed in the z-axis direction which is the coil axis direction, and the conductor pattern 20 is disposed within an opening region (inner diameter region) of the conductor pattern 10. That is, the conductor pattern 20 has an opening area smaller than that of the conductor pattern 10 and is disposed so as to overlap the opening region of the conductor pattern 10. Thus, the conductor pattern 10 goes around the outside of the conductor pattern 20 as viewed in the z-direction (coil axis direction), and the conductor pattern 20 is located within the opening region of the conductor pattern 10. In the example illustrated in FIGS. 2 and 3, the coil pattern CP1 is an example of a second coil pattern, and the coil pattern CP2 is an example of a first coil pattern.

An outer peripheral end 11 of the conductor pattern is connected to a terminal electrode E1. An inner peripheral end 12 of the conductor pattern 10 is connected to a through hole conductor 13 penetrating the substrate 2. The through hole conductor 13 is connected, through a connecting pattern 14 formed on the surface 2*b* of the substrate 2, to a through hole conductor 15 penetrating the substrate 2. The through hole conductor 15 is connected to a terminal electrode E2 formed on the surface 2*a* of the substrate 2. As a result, one end and the other end of the spiral conductor pattern 10 are connected respectively to the terminal electrodes E1 and E2. The terminal electrodes E1 and E2 are each connected to a capacitor C1 for resonant frequency adjustment and the IC module 5. With the above configuration, an antenna module is constituted by the antenna device 1 according to the present embodiment and the IC module 5, and a signal from the IC module 5 is supplied to the coil pattern CP1. The coil pattern CP1 and capacitor C1 constitute a resonant circuit. In FIG. 2, the capacitor C1 is connected parallel to the coil pattern CP1; alternatively, or in addition, the capacitor C1 may be connected in series to the coil pattern CP1.

An outer peripheral end 21 of the conductor pattern 20 is connected to a through hole conductor 23 penetrating the substrate 2. An inner peripheral end 22 of the conductor pattern 20 is connected to a capacitor electrode pattern 24. The through hole conductor 23 is connected to a capacitor electrode pattern 25 formed on the surface 2*b* of the substrate 2. The capacitor electrode patterns 24 and 25 face each other through the substrate 2 to constitute a capacitor C2. The coil pattern CP2 and capacitor C2 constitute another resonant circuit. Unlike the coil pattern CP1, the coil pattern CP2 does not have a terminal electrode for external connection and is connected only to the capacitor C2. That is, a serially completely closed circuit is constituted by the conductor patterns formed respectively on the surfaces 2*a* and 2*b* of the substrate 2. The coil pattern CP2 is coupled to the coil pattern CP1 to function as a booster antenna to extend communication distance. In the example illustrated in FIGS. 2 and 3, the capacitor C2 is an example of a first capacitor.

The coil pattern CP2 has the same coil axis direction as the coil pattern CP1 and is disposed within the opening region of the coil pattern CP1, thereby being coupled to the coil pattern CP1. The coupling coefficient between the coil patterns CP1 and CP2 can be adjusted mainly by the layout of the conductor patterns 10 and 20. In the example illustrated in FIG. 2, sections of the conductor patterns 10 and 20 that extend in the y-direction are close to each other, and the distance therebetween in the x-direction is minimized, so that the coupling degree between the coil patterns CP1 and CP2 is increased at the sections. On the other hand, sections of the conductor patterns 10 and 20 that extend in the x-direction are spaced apart from each other, and a sufficient distance is provided therebetween, so that the coupling degree between the coil patterns CP1 and CP2 is reduced at the sections. That is, as viewed in the z-axis direction (coil axis direction) the conductor pattern 10 is disposed so as to have a section (the section extending in the y-direction) at which the distance between the conductor patterns 10 and 20 is relatively large and a section (the section extending in the x-direction) at which the distance between the conductor patterns 10 and 20 is relatively small. As described above, by making the conductor patterns 10 and 20 partially close to and apart from each other at different locations, the coupling coefficient between the coil patterns CP1 and CP2 can be adjusted.

The capacitor C2 is disposed such that the distance between the capacitor electrode patterns 24, 25 and the conductor pattern 20 is made larger than the space between adjacent patterns of the conductor pattern 20. This prevents a magnetic field generated from the coil pattern CP2 from being affected by the capacitor C2.

Figure 4:
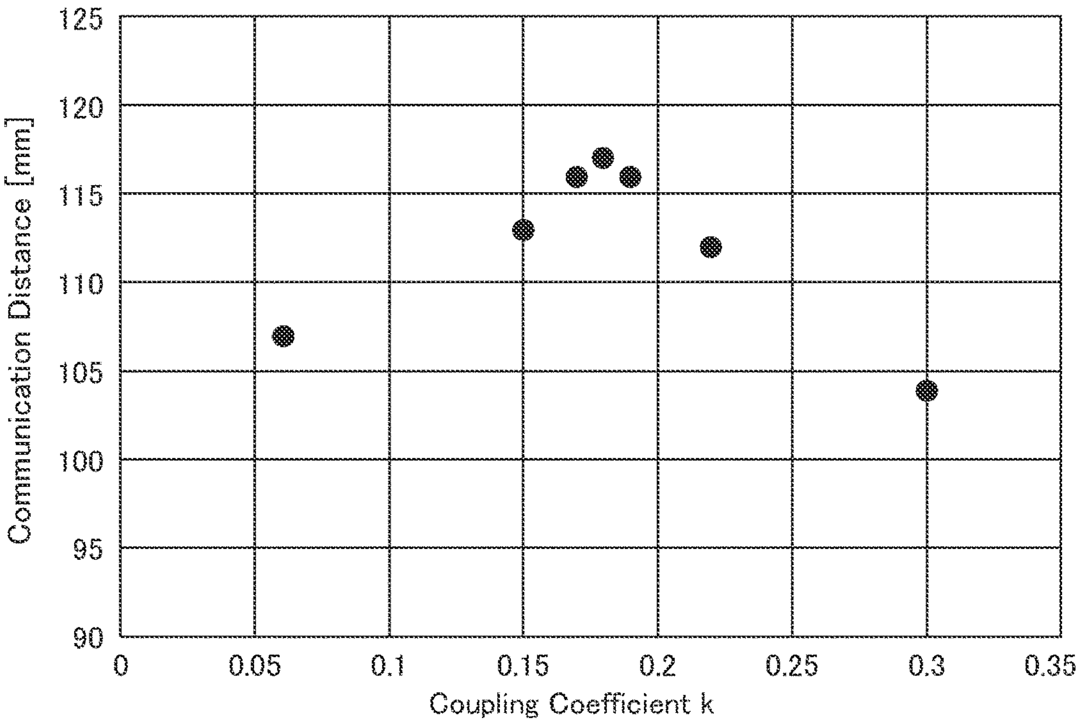
FIG. 4 is a graph illustrating the relation between a coupling coefficient k between the coil patterns CP1 and CP2 and communication distance.

FIG. 4 is a graph illustrating the relation between a coupling coefficient k between the coil patterns CP1 and CP2 and communication distance, in which the wireless communication frequency by NFC is set to 13.56 MHz.

As illustrated in FIG. 4, the communication distance becomes maximum when the coupling coefficient k between the coil patterns CP1 and CP2 is about 0.18. Considering this, the coupling coefficient k between the coil patterns CP1 and CP2 is preferably designed to be 0.15 or more and 0.22 or less and more preferably 0.17 or more and 0.19 or less. When the coupling coefficient k is 0.15 or more and 0.22 or less, a large communication distance can be achieved, and when the coupling coefficient k is 0.17 or more and 0.19 or less, a larger communication distance can be achieved.

As illustrated in FIG. 2, the conductor pattern 10 positioned outside and constituting the coil pattern CP1 is gently curved at its corners 19, whereas the conductor pattern 20 positioned inside and constating the coil pattern CP2 is bent at substantially right angles at its corers 29. That is, the corner 29 of the conductor pattern 20 is smaller in curvature radius than the corner 19 of the conductor pattern 10. As a result, in the conductor pattern 10 positioned outside, electric field concentration on the corners 19 is mitigated. Further, in the conductor pattern 20 positioned inside, the area of the opening region can be maximized by bending the corners 29 at substantially right angles.

Further, the coil pattern CP1 desirably has the lowest possible resistance value since it is connected to the IC module 5. On the other hand, the coil pattern CP2 constitutes a closed circuit connected to no external circuit, so that a certain resistance value is allowed as compared to the coil pattern CP1. Considering this, in the present embodiment, a pattern width W1 of the coil pattern CP1 is designed wider than a pattern width W2 of the coil pattern CP2.

Assuming that the resonant frequency of the resonant circuit constituted by the coil pattern CP1 and capacitor C1 is $f_1$ and that the resonant frequency of the resonant circuit constituted by the coil pattern CP2 and capacitor C2 is $f_2$, the resonant frequencies $f_1$ and $f_2$ are designed to be mutually different frequencies. Specifically, the resonant frequencies $f_1$ and $f_2$ are designed to be different from and sandwich the wireless communication frequency by NFC. That is, when the wireless communication frequency by NFC is 13.56 MHz, one of the resonant frequencies $f_1$ and $f_2$ is set to less than 13.56 MHz, and the other one thereof is to more than 13.56 MHz. When the wireless communication frequency by NFC is 13.56 MHz, the difference between the resonant frequencies $f_1$ and $f_2$ is preferably 3 MHz or more. The resonant frequencies $f_1$ and $f_2$ are resonant frequencies when the metal member 3 and magnetic member 4 are present immediately below the above resonant circuits.

Figure 5:
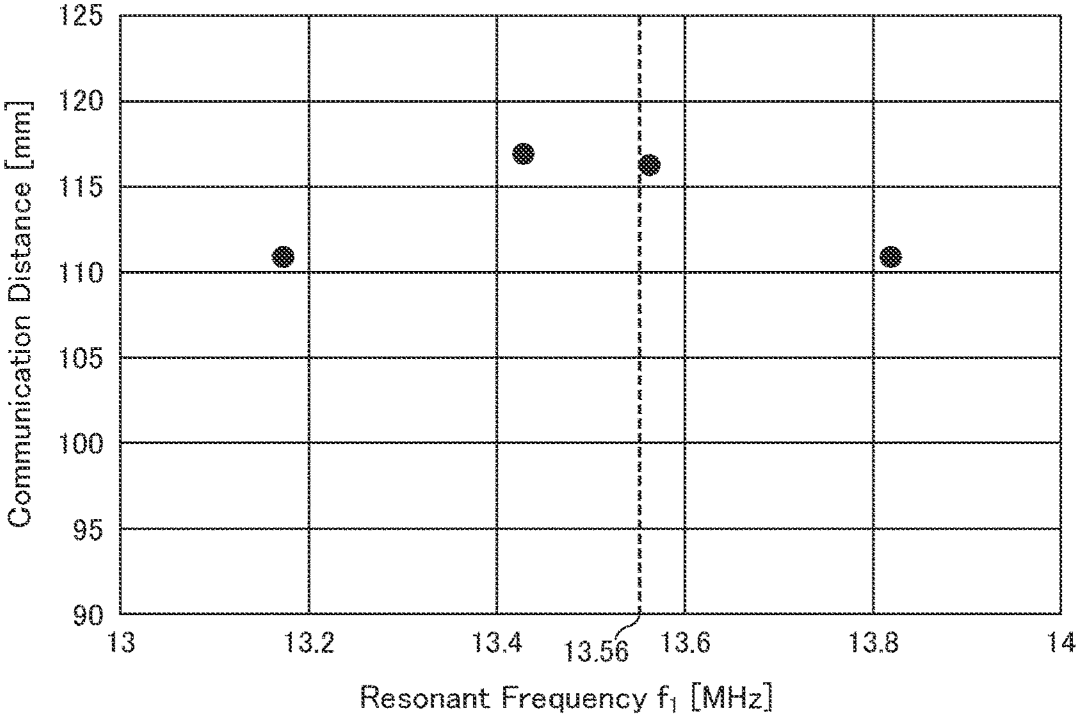
FIG. 5 is a graph illustrating the relation between the resonant frequency f1 and communication distance.
Figure 6:
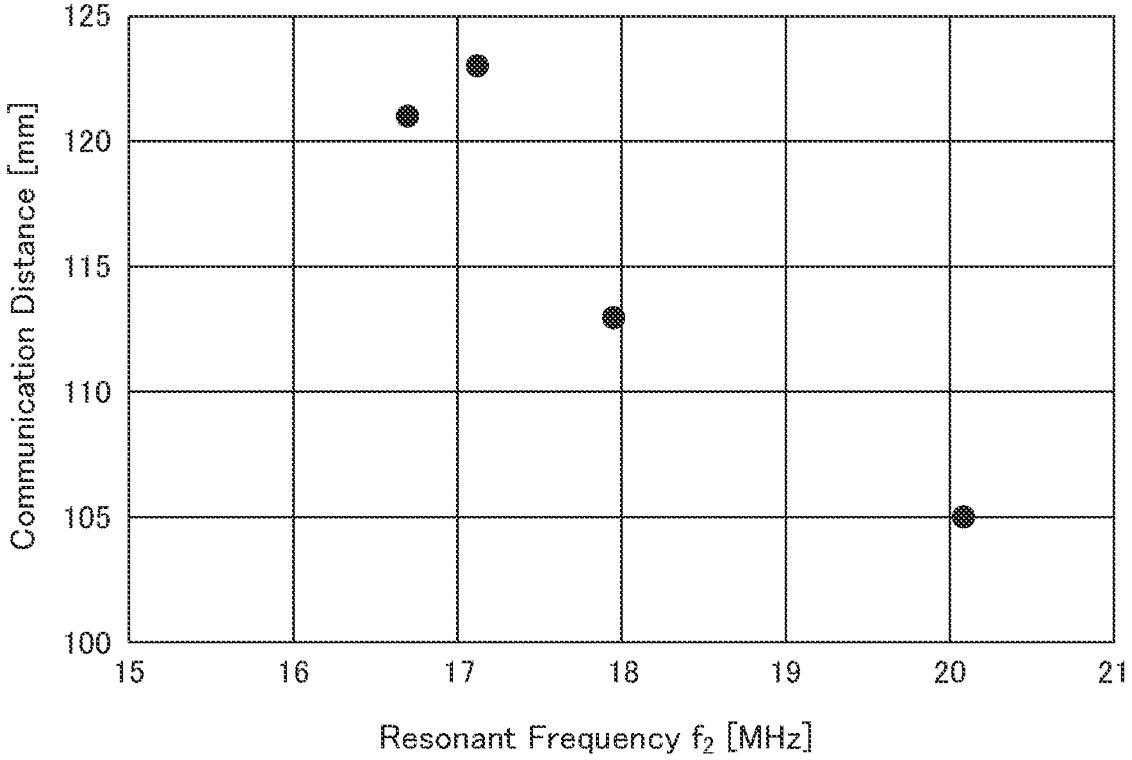
FIG. 6 is a graph illustrating the relation between the resonant frequency f2 and communication distance.

FIG. 5 is a graph illustrating the relation between the resonant frequency $f_1$ and communication distance, and FIG. 6 is a graph illustrating the relation between the resonant frequency $f_2$ and communication distance. In both FIGS. 5 and 6, the wireless communication frequency by NFC is set to 13.56 MHz.

As illustrated in FIG. 5, when the resonant frequency $f_1$ of the resonant circuit constituted by the coil pattern CP1 and capacitor C1 is designed slightly lower than 13.56 MHz which is the wireless communication frequency, communication distance is increased, and when the resonant frequency $f_1$ is set to 13.43 MHz, communication distance is maximized. Further, as illustrated in FIG. 6, when the resonant frequency $f_2$ of the resonant circuit constituted by the coil pattern CP2 and capacitor C2 is designed higher than 13.56 MHz which is the wireless communication frequency by 3 MHz or more, communication distance is increased. In the example illustrated in FIGS. 5 and 6, when the difference between the resonant frequencies $f_1$ and $f_2$ is smaller than 3 MHz, the resonant frequencies $f_1$ and $f_2$ alternate with each other. In this case, matching between the resonant circuit constituted by the coil pattern CP1 and capacitor C1 and the resonant circuit constituted by the coil pattern CP2 and capacitor C2 fails, resulting in a significant reduction in communication distance.

As described above, in the antenna device 1 according to the present embodiment, the coil patterns CP1 and CP2 are both provided on the surface 2*a* of the substrate 2, so that the thickness in the z-direction can be reduced. Further, the coil patterns CP1 and CP2 do not overlap each other in the z-direction, so that a stray capacitance therebetween can also be reduced. Furthermore, the capacitor electrode patterns 24 and 25 constituting the capacitor C2 are formed respectively on the front and back surfaces of the substrate 2, making it possible to reduce the number of components.

First Modification

Figure 7:
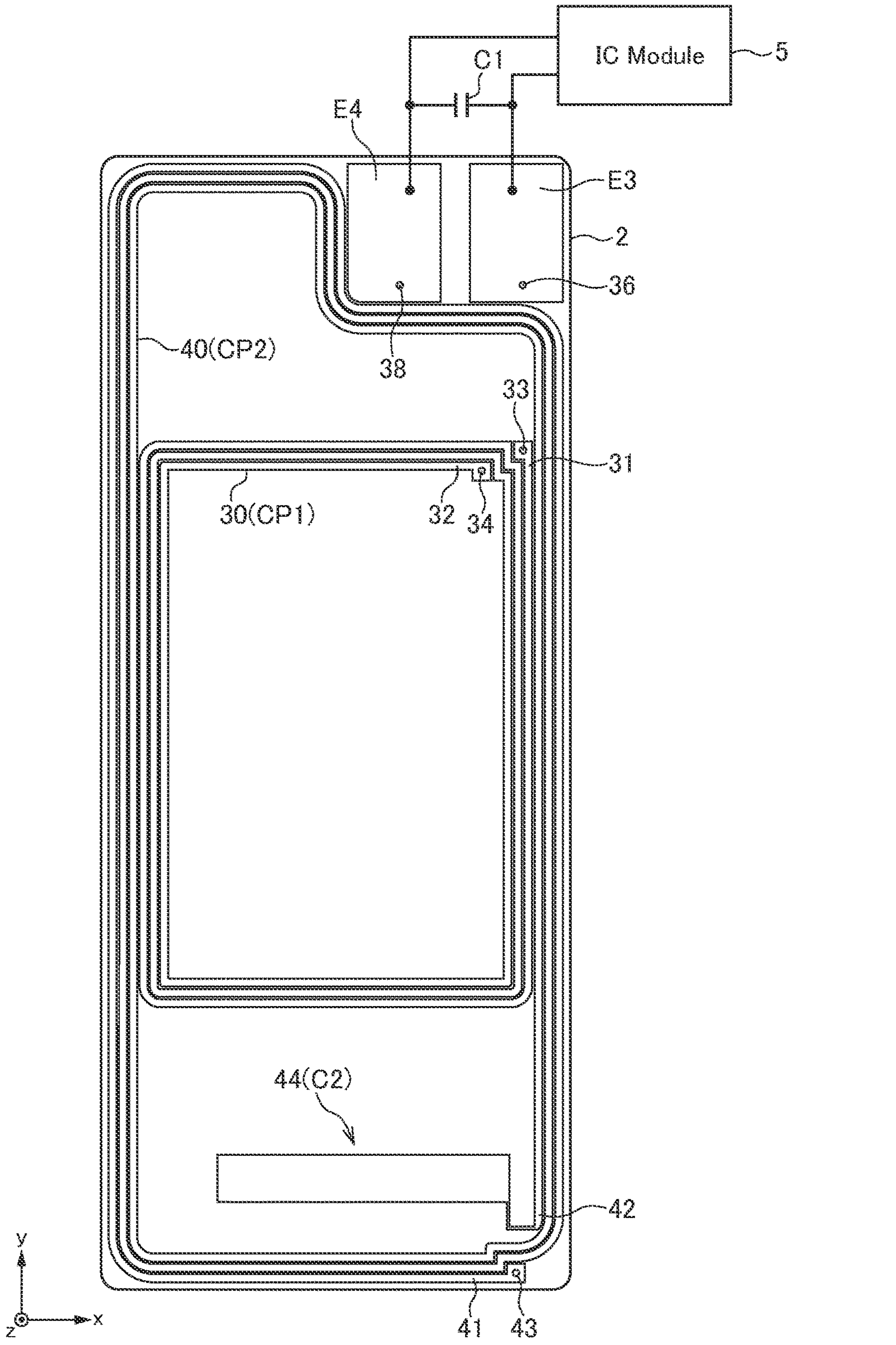
FIG. 7 is a schematic plan view illustrating the shape of a conductor pattern formed on the surface 2*a* of the substrate 2 according to a first modification.
Figure 8:
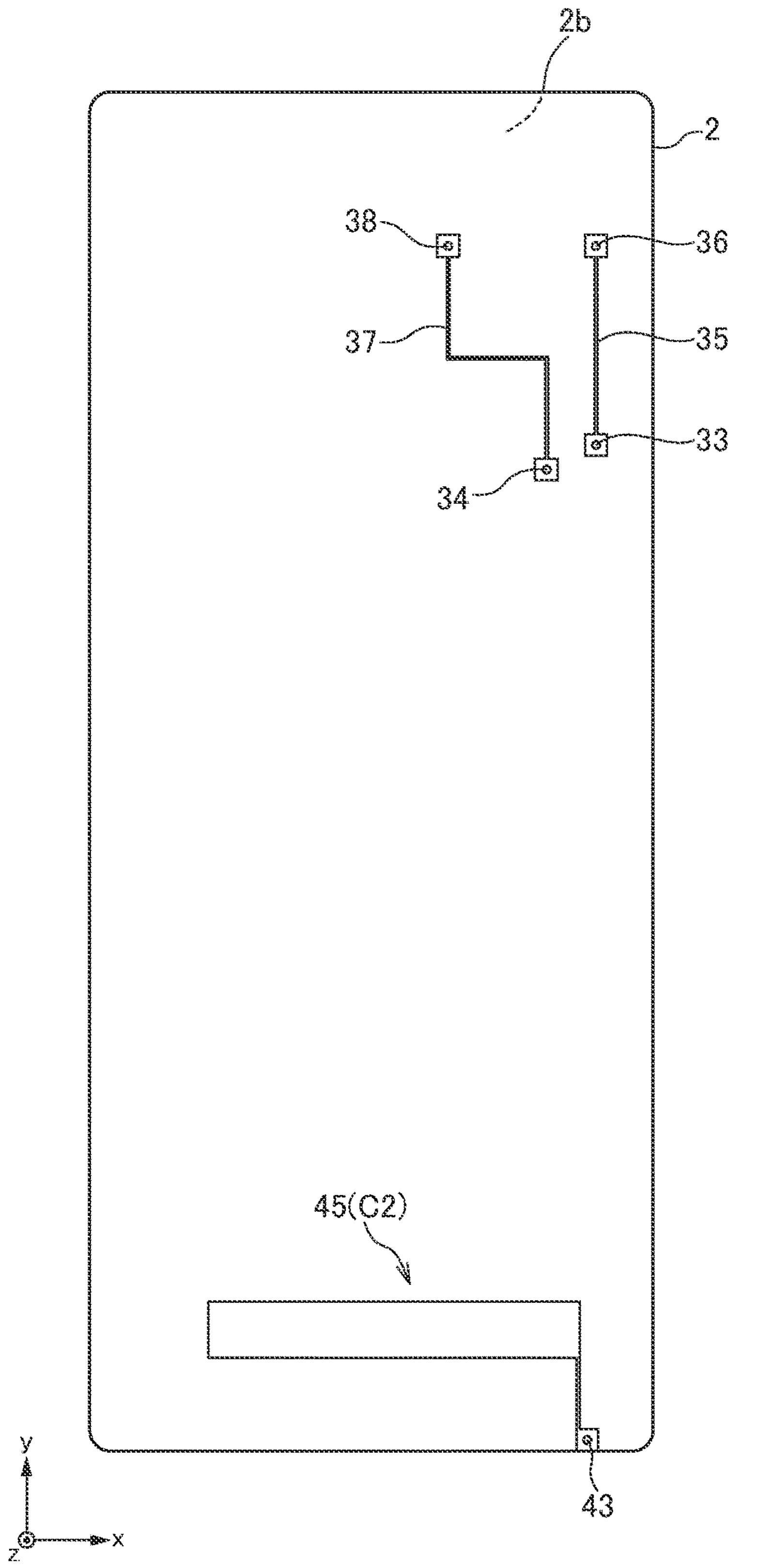
FIG. 8 is a schematic plan view illustrating the shape of a conductor pattern formed on a surface 2*b* of the substrate 2 according to the first modification.

FIGS. 7 and 8 are each a schematic plan view illustrating the configuration of an antenna device according to a first modification. FIG. 7 illustrates the shape of a conductor pattern formed on the surface 2*a* of the substrate 2, and FIG. 8 illustrates the shape of a conductor pattern formed on the surface 2*b* of the substrate 2 as viewed through the substrate 2 from the surface 2*a* side.

As illustrated in FIG. 7, there are formed on the surface 2*a* of the substrate 2 a conductor pattern 30 spirally wound in three turns and a conductor pattern 40 spirally wound in three turns. The conductor pattern 30 constitutes the coil pattern CP1, and the conductor pattern 40 constitutes the coil pattern CP2. The conductor patterns 30 and 40 each have a substantially rectangular shape as viewed in the z-axis direction which is the coil axis direction, and the conductor pattern 30 is disposed within an opening region (inner diameter region) of the conductor pattern 40. That is, the conductor pattern 30 has an opening area smaller than that of the conductor pattern 40 and is disposed so as to overlap the opening region of the conductor pattern 40. Thus, the conductor pattern 40 goes around the outside of the conductor pattern 30 as viewed in the z-direction (coil axis direction), and the conductor pattern 30 is located within the opening region of the conductor pattern 40. In the example illustrated in FIGS. 7 and 8, the coil pattern CP1 is an example of the first coil pattern, and the coil pattern CP2 is an example of the second coil pattern.

An outer peripheral end 31 of the conductor pattern 30 is connected to a through hole conductor 33 penetrating the substrate 2. An inner peripheral end 32 of the conductor pattern 30 is connected to a through hole conductor 34 penetrating the substrate 2. The through hole conductor 33 is connected, through a connecting pattern 35 formed on the surface 2*b* of the substrate 2, to a through hole conductor 36 penetrating the substrate 2. The through hole conductor 36 is connected to a terminal electrode E3 formed on the surface 2*a* of the substrate 2. The through hole conductor 34 is connected, through a connecting pattern 37 formed on the surface 2*b* of the substrate 2, to a through hole conductor 38 penetrating the substrate 2. The through hole conductor 38 is connected to a terminal electrode E4 formed on the surface 2*a* of the substrate 2. As a result, one end and the other end of the spiral conductor pattern 30 are connected respectively to the terminal electrodes E3 and E4. The terminal electrodes E3 and E4 are each connected to the capacitor C1 for resonant frequency adjustment and the IC module 5. With the above configuration, an antenna module is constituted by the antenna device according to the first modification and the IC module 5.

An outer peripheral end 41 of the conductor pattern 40 is connected to a through hole conductor 43 penetrating the substrate 2. An inner peripheral end 42 of the conductor pattern 40 is connected to a capacitor electrode pattern 44. The through hole conductor 43 is connected to a capacitor electrode pattern 45 formed on the surface 2*b* of the substrate 2. The capacitor electrode patterns 44 and 45 face each other through the substrate 2 to constitute the capacitor C2. The coil pattern CP2 and capacitor C2 constitute a closed circuit and function as a booster antenna to extend communication distance. In the example illustrated in FIGS. 7 and 8, the capacitor C2 is an example of the first capacitor.

As exemplified by the first modification, a configuration may be employed, in which the coil pattern CP2 functioning as a booster antenna is disposed outside, and the coil pattern CP1 connected to the IC module 5 and functioning as an antenna coil is disposed within the opening region of the coil pattern CP2. In this first modification, the pattern width of the coil pattern CP1 and the pattern width of the coil pattern CP2 are the same; however, the pattern width of the coil pattern CP1 connected to the IC module 5 is preferably made larger than the pattern width of the coil pattern CP2 constituting a closed circuit connected to no external circuit. This can reduce the resistance value of the coil pattern CP1 connected to the IC module 5.

Second Modification

Figure 9:
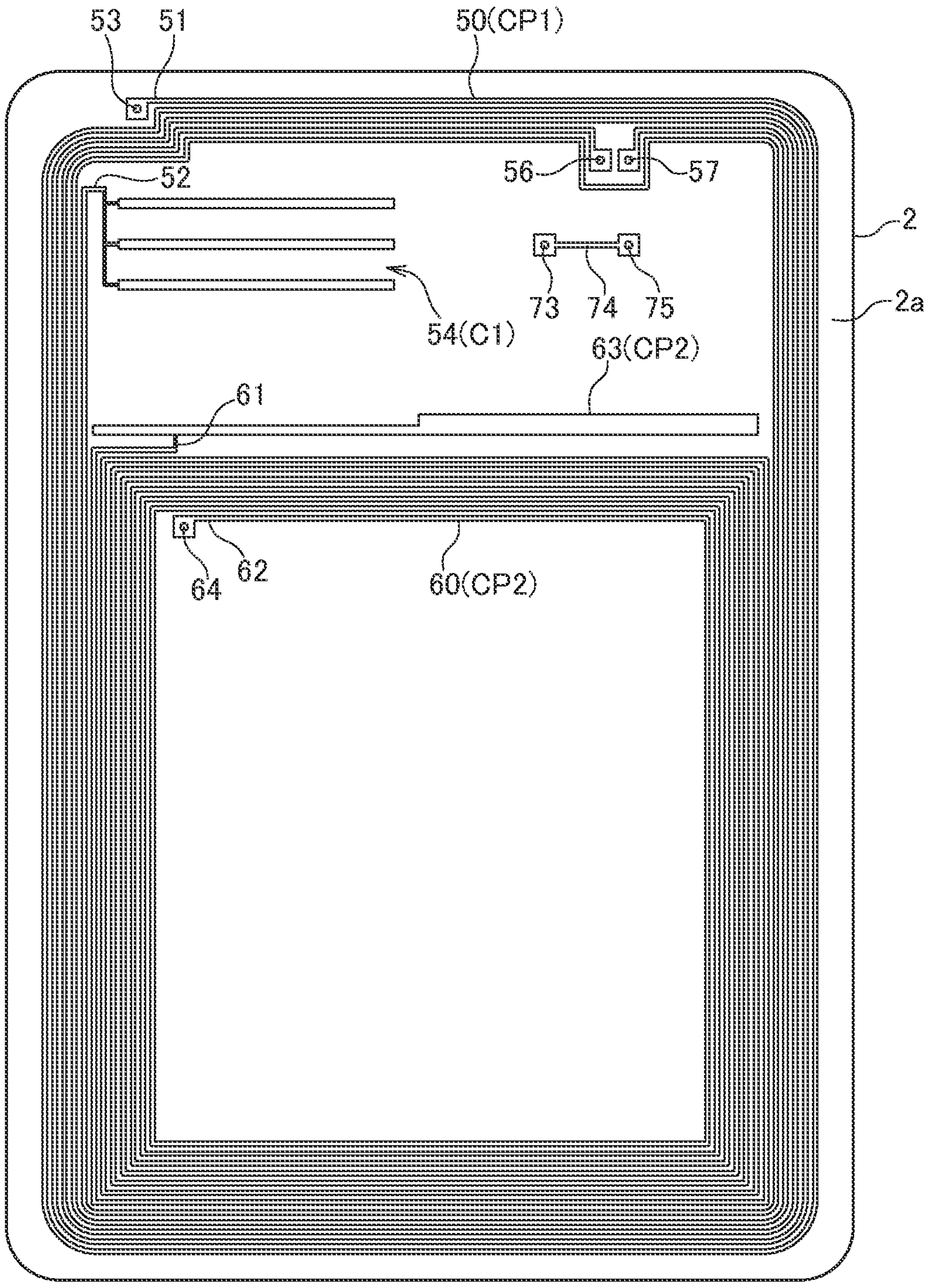
FIG. 9 is a schematic plan view illustrating the shape of a conductor pattern formed on the surface 2*a* of the substrate 2 according to a second modification.
Figure 10:
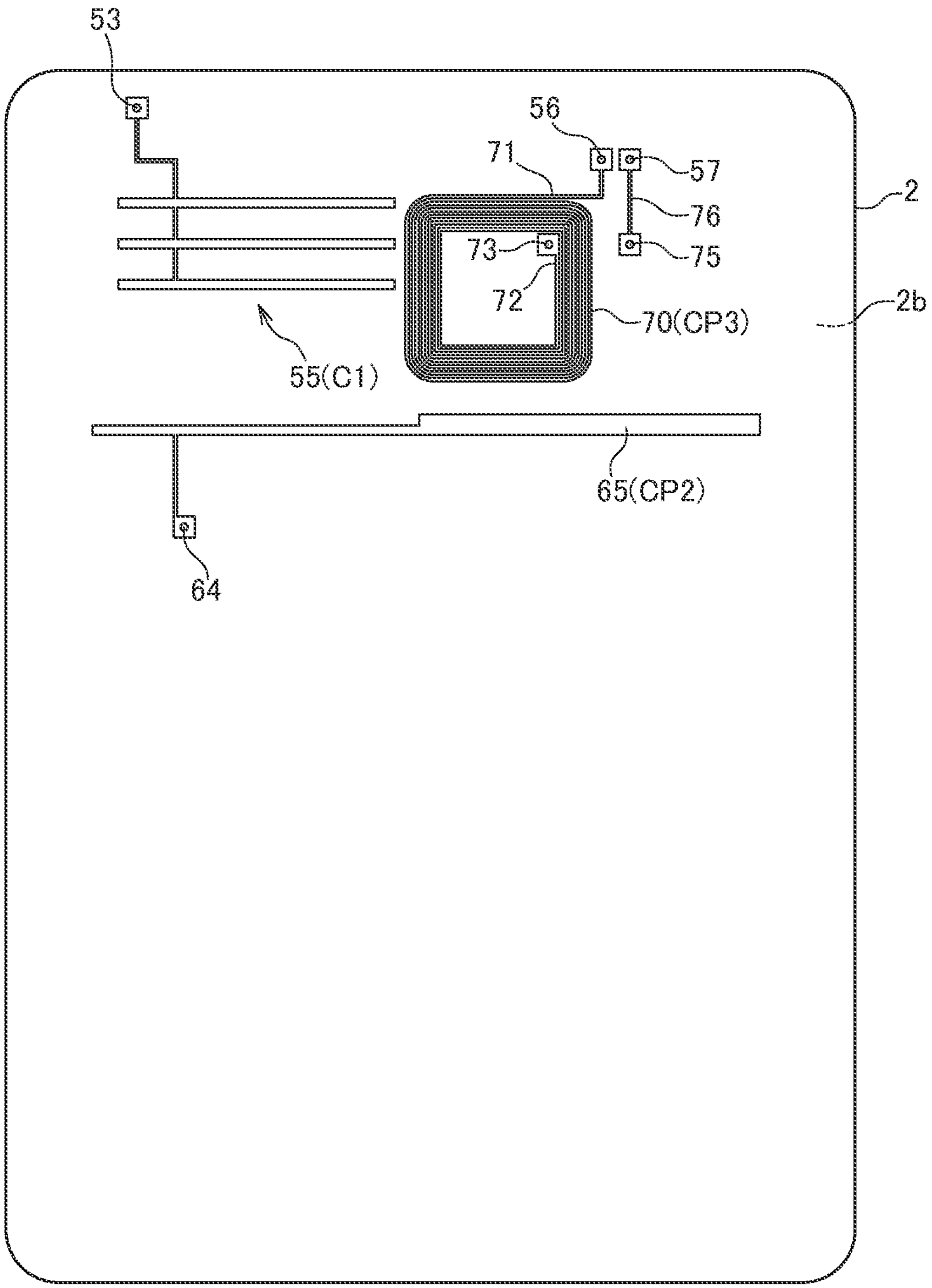
FIG. 10 is a schematic plan view illustrating the shape of a conductor pattern formed on a surface 2*b* of the substrate 2 according to the second modification.

FIGS. 9 and 10 are each a schematic plan view illustrating the configuration of an antenna device according to a second modification. FIG. 9 illustrates the shape of a conductor pattern formed on the surface 2*a* of the substrate 2, and FIG. 10 illustrates the shape of a conductor pattern formed on the surface 2*b* of the substrate 2 as viewed through the substrate 2 from the surface 2*a* side.

As illustrated in FIG. 9, there are formed on the surface 2*a* of the substrate 2 a conductor pattern 50 spirally wound in five turns and a conductor pattern 60 spirally wound in seven turns. The conductor pattern 50 constitutes the coil pattern CP1, and the conductor pattern 60 constitutes the coil pattern CP2. That is, in the example illustrated in FIGS. 9 and 10, the coil pattern CP2 has a larger number of turns than the coil pattern CP1. The conductor patterns 50 and 60 each have a substantially rectangular shape as viewed in the z-axis direction which is the coil axis direction, and the conductor pattern 60 is disposed within an opening region (inner diameter region) of the conductor pattern 50. That is, the conductor pattern 60 has an opening area smaller than that of the conductor pattern 50 and is disposed so as to overlap the opening region of the conductor pattern 50. Thus, the conductor pattern 50 goes around the outside of the conductor pattern 60 as viewed in the z-direction (coil axis direction), and the conductor pattern 60 is located within the opening region of the conductor pattern 50. In the example illustrated in FIGS. 9 and 10, the coil pattern CP1 is an example of the second coil pattern, and the coil pattern CP2 is an example of the first coil pattern.

An outer peripheral end 51 of the conductor pattern 50 is connected to a through hole conductor 53 penetrating the substrate 2. An inner peripheral end 52 of the conductor pattern 50 is connected to a capacitor electrode pattern 54. The through hole conductor 53 is connected to a capacitor electrode pattern 55 formed on the surface 2*b* of the substrate 2. The capacitor electrode patterns 54 and 55 face each other through the substrate 2 to constitute a capacitor C3.

An outer peripheral end 61 of the conductor pattern 60 is connected to a capacitor electrode pattern 63. An inner peripheral end 62 of the conductor pattern 60 is connected to a through hole conductor 64 penetrating the substrate 2. The through hole conductor 64 is connected to a capacitor electrode pattern 65 formed on the surface 2*b* of the substrate 2. The capacitor electrode patterns 63 and 65 face each other through the substrate 2 to constitute the capacitor C2. The coil pattern CP2 and capacitor C2 constitute a closed circuit and function as a booster antenna to extend communication distance. In the example illustrated in FIGS. 9 and 10, the capacitor C2 is an example of the first capacitor.

Further, a coil pattern CP3 is provided on the surface 2*b* of the substrate 2 at a position within the opening region of the conductor pattern 50 and outside the opening region of the conductor pattern 60. The coil pattern CP3 is spirally wound in a plurality of turns. An outer peripheral end 71 of the coil pattern CP3 is connected to a through hole conductor 56 penetrating the substrate 2, and an inner peripheral end 72 thereof is connected to a through hole conductor 73 penetrating the substrate 2. The through hole conductor 73 is connected, through a connecting pattern 74 formed on the surface 2*a* of the substrate 2, to a through hole conductor 75 penetrating the substrate 2. The through hole conductor 75 is connected, through a connecting pattern 76 formed on the surface 2*b* of the substrate 2, to a through hole conductor 57 penetrating the substrate 2.

The through hole conductors 56 and 57 are connected respectively to division positions in a predetermined turn (in the example illustrated in FIG. 9, the second turn from the inner peripheral side) of the conductor pattern 50 constituting the coil pattern CP1. This makes the predetermined turn of the conductor pattern 50 pass through the coil pattern CP3. The coil pattern CP3 is electromagnetically coupled to a not-shown IC module. That is, in this example, the coil pattern CP1 is not directly connected to the IC module but through the coil pattern CP3. Thus, an antenna module is constituted by the antenna device according to the second modification and the not-shown IC module.

As exemplified in the second modification, the coil pattern CP3 connected to the coil pattern CP1 may additionally be provided so as to make the coil pattern CP1 be electromagnetically connected to the IC module through the coil pattern CP3. Further, as exemplified by the second modification, the capacitor C1 connected to the coil pattern CP1 may be formed on the substrate 2. This can further reduce the number of components.

While the preferred embodiment of the present disclosure has been described, the present disclosure is not limited to the above embodiment, and various modifications may be made within the scope of the present disclosure, and all such modifications are included in the present disclosure.

For example, although the coil patterns CP1 and CP2 are both formed on the surface 2*a* of the substrate 2 in the above embodiment, one and the other of the coil patterns CP1 and CP2 may be formed respectively on the surfaces 2*a* and 2*b* of the substrate 2. Further, the coil patterns CP1 and CP2 may be formed on the surfaces of mutually different substrates.

The technology according to the present disclosure includes the following configuration examples, but not limited thereto.

An antenna device according to the present disclosure includes a substrate; and a first coil pattern, a second coil pattern, and a first capacitor which are provided on a surface of the substrate, wherein an opening region of the first coil pattern is smaller in area than an opening region of the second coil pattern, wherein the first coil pattern is disposed so as to overlap the opening region of the second coil pattern, and wherein one of the first and second coil patterns is connected to the first capacitor to constitute a closed circuit.

This reduces the distance between the first and second coil patterns to thereby reduce the space required. Further, since the first capacitor is provided on the surface of the substrate, the number of components is also reduced.

The first and second coil patterns may be both provided on one surface of the substrate. This reduces the space required and further reduces the number of components.

The first coil pattern may have first and second sections, and wherein, when viewed in a coil axis direction of the first coil pattern, a distance between the first and second coil patterns at the first section may be larger than a distance between the first and second coil patterns at the second section. This allows the coupling coefficient between the first and second coil patterns to be adjusted.

The first capacitor may include a pair of electrode patterns that face each other through the substrate, and the distance between the electrode pattern and the one of the first and second coil patterns may be larger than the space between adjacent patterns of the one of the first and second coil patterns. This can prevent a magnetic field generated from the one of the first and second coil patterns from being affected by the first capacitor.

The coupling coefficient between the first and second coil patterns may be 0.15 or more and 0.22 or less, or may be 0.17 or more and 0.19 or less. This can extend communication distance.

The antenna device according to the present disclosure may further include a second capacitor connected to the other of the first and second coil patterns. The one of the first and second coil patterns and the first capacitor may constitute a first resonant circuit, and the other of the first and second coil patterns and the second capacitor may constitute a second resonant circuit. The difference between the resonant frequency of the first resonant circuit and the resonant frequency of the second resonant circuit may be 3 MHz or more. This can extend communication distance. In this case, both the resonant frequencies of the first and second resonant circuits may differ from a frequency used in wireless communication, and the frequency used in wireless communication may be set between the resonant frequencies of the first and second resonant circuits. This can further extend communication distance.

The first and second coil patterns may have a substantially rectangular shape as viewed in the axis direction, and the corner of the first coil pattern may have a smaller curvature radius than the corner of the second coil pattern. This can mitigate magnetic field concentration on the second coil pattern and increase the opening area of the first coil pattern.

Further, an antenna module according to the present disclosure includes the antenna device described above, a metal member disposed so as to overlap the antenna device, a magnetic member disposed between the antenna device and the metal member, and an IC module that performs transmission/reception through the other of the first and second coil patterns. This can provide a small-sized antenna module having a reduced number of components.

The other of the first and second coil patterns may be connected to the IC module. This simplifies the configuration. In this case, the other of the first and second coil patterns may have a larger pattern width than the one of the first and second coil patterns. This reduces the resistance value of the other of the first and second coil patterns that is connected to the IC module.

The antenna module according to the present disclosure may have a third coil pattern connected to the other of the first and second coil patterns, and the third coil pattern and IC module may be electromagnetically connected to each other. This can eliminate the need to provide a terminal electrode.

What is claimed is:

1. An antenna device comprising:

a substrate; and a first coil pattern, a second coil pattern, and a first capacitor which are provided on a surface of the substrate, wherein both the first and second coil patterns are provided on one surface of the substrate, wherein an opening region of the first coil pattern is smaller in area than an opening region of the second coil pattern, wherein the first coil pattern is disposed so as to overlap the opening region of the second coil pattern;

wherein the first coil pattern and the second coil pattern are coupled to each other without being directly connected, and wherein one of the first and second coil patterns is connected to the first capacitor to constitute a closed circuit.

2. The antenna device as claimed in claim 1, wherein the first coil pattern has first and second sections, and wherein, when viewed in a coil axis direction of the first coil pattern, a distance between the first and second coil patterns at the first section is larger than a distance between the first and second coil patterns at the second section.

3. The antenna device as claimed in claim 1, wherein the first capacitor includes a pair of electrode patterns that face each other through the substrate, and wherein a distance between the electrode patterns and the one of the first and second coil patterns is larger than a space between adjacent patterns of the one of the first and second coil patterns.

4. The antenna device as claimed in claim 1, wherein a coupling coefficient between the first and second coil patterns is 0.15 or more and 0.22 or less.

5. The antenna device as claimed in claim 4, wherein the coupling coefficient between the first and second coil patterns is 0.17 or more and 0.19 or less.

6. The antenna device as claimed in claim 1, further comprising a second capacitor connected to other of the first and second coil patterns, wherein the one of the first and second coil patterns and the first capacitor constitute a first resonant circuit, wherein the other of the first and second coil patterns and the second capacitor constitute a second resonant circuit, and wherein a difference between a resonant frequency of the first resonant circuit and a resonant frequency of the second resonant circuit is 3 MHz or more.

7. The antenna device as claimed in claim 6, wherein both the resonant frequencies of the first and second resonant circuits differ from a frequency used in wireless communication.

8. The antenna device as claimed in claim 7, wherein the frequency used in wireless communication is set between the resonant frequencies of the first and second resonant circuits.

9. The antenna device as claimed in claim 1, wherein the first and second coil patterns have a substantially rectangular shape as viewed in an axis direction, and wherein a corner of the first coil pattern has a smaller curvature radius than a corner of the second coil pattern.

10. The antenna device as claimed in claim 1, further comprising a third coil pattern provided on other surface of the substrate, wherein the third coil pattern is connected to other of the first and second coil patterns, wherein an opening region of the third coil pattern is smaller in area than the opening region of the second coil pattern, wherein the third coil pattern is disposed so as to overlap the opening region of the second coil pattern, and wherein the opening region of the third coil pattern is located outside the opening region of the first coil pattern.

11. The antenna device as claimed in claim 10, further comprising a second capacitor connected to the other of the first and second coil patterns, wherein the second capacitor includes a pair of electrode patterns that face each other through the substrate, and wherein the pair of electrode patterns of the second capacitor is disposed so as to overlap the opening region of the second coil pattern and outside the opening region of the first coil pattern.

12. The antenna device as claimed in claim 11, wherein the first capacitor includes a pair of electrode patterns that face each other through the substrate, and wherein the pair of electrode patterns of the first capacitor is disposed so as to overlap the opening region of the second coil pattern and outside the opening region of the first coil pattern.

13. The antenna device as claimed in claim 10, wherein the first coil pattern has a larger number of turns than the second coil pattern.

14. The antenna device as claimed in claim 10, wherein a predetermined turn of the second coil pattern has a first division position and a second division position separated from each other by a cutout, wherein the first division position is connected to an outer peripheral end of the third coil pattern, and wherein the second division position is connected to an inner peripheral end of the third coil pattern.

15. The antenna device as claimed in claim 14, wherein the predetermined turn of the second coil pattern is not an innermost turn of the second coil pattern.

16. An antenna module comprising:

an antenna device comprising:

a substrate; and a first coil pattern, a second coil pattern, and a first capacitor which are provided on a surface of the substrate, wherein both the first and second coil patterns are provided on one surface of the substrate, wherein an opening region of the first coil pattern is smaller in area than an opening region of the second coil pattern, wherein the first coil pattern is disposed so as to overlap the opening region of the second coil pattern, and wherein the first coil pattern and the second coil pattern are coupled to each other without being directly connected, and wherein one of the first and second coil patterns is connected to the first capacitor to constitute a closed circuit;

a metal member disposed so as to overlap the antenna device;

a magnetic member disposed between the antenna device and the metal member; and an IC module that performs transmission/reception through other of the first and second coil patterns.

17. The antenna module as claimed in claim 16, wherein the other of the first and second coil patterns is connected to the IC module.

18. The antenna module as claimed in claim 17, wherein the other of the first and second coil patterns has a larger pattern width than the one of the first and second coil patterns.

19. The antenna module as claimed in claim 16, further comprising a third coil pattern connected to the other of the first and second coil patterns, wherein the third coil pattern and the IC module are electromagnetically connected to each other.

20. The antenna module as claimed in claim 16, wherein the antenna device further comprises a third coil pattern provided on other surface of the substrate, wherein the third coil pattern is connected to other of the first and second coil patterns, wherein an opening region of the third coil pattern is smaller in area than the opening region of the second coil pattern, wherein the third coil pattern is disposed so as to overlap the opening region of the second coil pattern, and wherein the opening region of the third coil pattern is located outside the opening region of the first coil pattern.

* * * * *